J. V. ROBINSON.
RESILIENT DRIVING CONNECTION FOR MOTOR DRIVEN VEHICLES.
APPLICATION FILED APR. 6, 1914. RENEWED APR. 8, 1919.
1,324,926.   Patented Dec. 16, 1919.
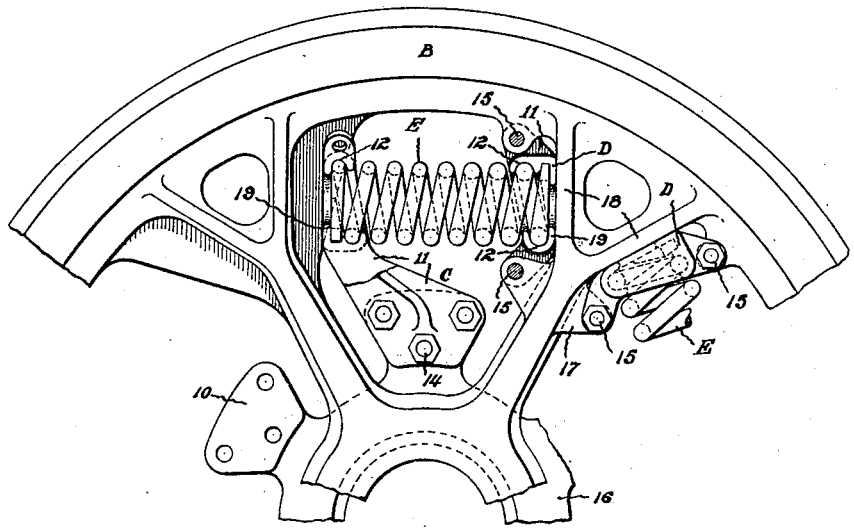
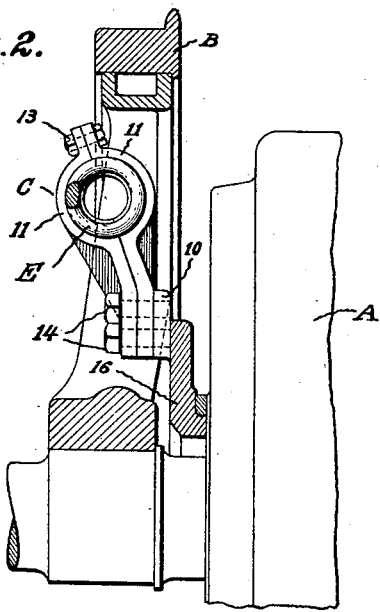
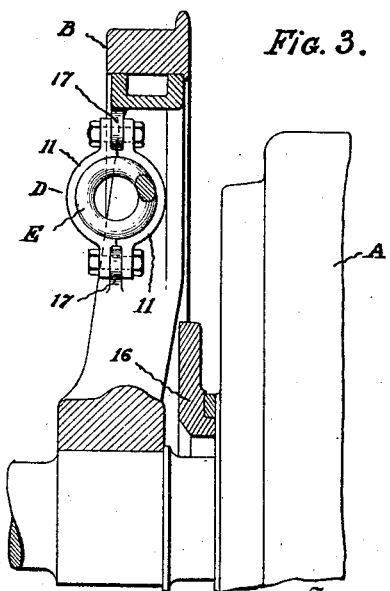

UNITED STATES PATENT OFFICE.

JOSEPH V. ROBINSON, OF CHEVY CHASE, MARYLAND.

RESILIENT DRIVING CONNECTION FOR MOTOR-DRIVEN VEHICLES.

1,324,926.  Specification of Letters Patent.  Patented Dec. 16, 1919.

Application filed April 6, 1914, Serial No. 830,011. Renewed April 8, 1919. Serial No. 288,659.

*To all whom it may concern:*

Be it known that I, JOSEPH V. ROBINSON, a citizen of the United States, and a resident of Chevy Chase, county of Montgomery, State of Maryland, have invented certain new and useful Improvements in Resilient Driving Connections for Motor-Driven Vehicles, of which the following is a specification.

My invention relates to resilient driving connections such as are interposed between the propelling motors and the driving wheels of electric vehicles to impart the rotary motion of the motor to the driving wheels of the vehicle, and among its objects are to provide an improved resilient driving connection for this purpose which will resist the forces that rotate the driving wheels of the vehicle with a rapidly increasing force, secured preferably by the use of a helical spring coiled of a gradually tapering bar, and also to provide improved brackets for rigidly securing said spring in place and for transmitting the rotary motion of the motor through the spring to the driving wheels of the vehicle upon which it is used.

With these objects in view, my invention consists in the combinations, arrangements and constructions hereinafter described, pointed out in the appended claims and illustrated in the accompanying drawings, in which:

Figure 1, is a side view of my improvement showing its application to a member of the propelling motor and to the driving wheel of the vehicle. Some of the parts in this view are shown in section.

Fig. 2, is a front face view of one of the improved bracket members of my invention, showing also a portion of the propelling motor, and Fig. 3, is a front face view of another improved bracket member of my invention.

Referring to the drawings: Any suitable propelling motor A, preferably electric, and any suitable driving wheel B may be used with my improvement. I provide the propelling motor with arms 10 adapted to be rotated by the motor, and to impart the rotary motion of the motor to the driving wheel B and rotate the latter I provide and interpose between the motor and the driving wheel, a suitable number of two-part brackets C—D, comprising halves 11, each of which halves have on their inner face a semi-circumferential groove 12 for snugly receiving the resilient member of my improvement. They are clamped together with transversely extending bolts 13, 14 and 15. The bracket C I secure, as by the bolts 14, to the ears 10 of a member 16, connected with the propelling motor A and adapted to be rotated thereby, and the bracket D I secure, as by bolts 15, to the lugs 17 integral with or otherwise secured to the driving wheel B. I arrange the bracket so that it bears against the spoke 18, as shown, to free the bolts 15 of the shearing strains of service.

Between the halves of each of the brackets C—D, I rigidly clamp, as by the aforesaid bolts 13, 14 and 15, the resilient means of my improvement, preferably a spring E, which said spring rests in the circumferential groove 12 and bears against an annular wall or shoulder 19 of the halves 11 of both of the brackets and extends from one bracket to the other. The spring is coiled of a suitably tapered bar, preferably a round gradually tapering bar, and has throughout its length a common outside diameter and a varying inside diameter.

The use of this construction of spring as the resilient means for imparting the rotary motion of the propelling motor A to the driving wheel B of the vehicle, is highly advantageous as it entirely eliminates the sudden, snappy jerk upon the vehicle occurring in starting the motor when other forms of springs are used. The longitudinal and lateral resistance of the spring E to the initial movement of the motor A relative to the driving wheel B being much less, by reason of the conformation of its coils, than to continued movement relative to the wheel, a highly efficient cushion is obtained, which presents to such movement of the motor a varying resistance increasing in greater progression than the extent of the movement, thereby freeing the vehicle of the jerk and jar that ordinarily occurs when starting and accelerating the propelling motor.

It will, of course, be understood that as many of the springs E and brackets C—D as desired may be used and placed between the motor A and driving wheel B as wished, and also that the clamping effect of the brackets upon the spring may be increased or lessened by tightening up or loosening the bolts 13, 14 and 15.

Having thus described my said invention, what I claim as new and desire to secure by United States Letters Patent is:

1. In a resilient driving connection for motor driven vehicles, the combination with the motor and a driving wheel of the vehicle, of a two-part bracket, each part having on its inner face a semi-circumferential groove, a resilient member, and means for clamping together the parts of said bracket with said member seated in said groove.

2. In a resilient driving connection for motor driven vehicles, the combination with the motor and a driving wheel of the vehicle, of a two-part bracket, each part having on its inner face a semi-circumferential groove, an annular wall, and a spring rigidly secured in said groove and bearing against said wall.

3. In a resilient driving connection for motor driven vehicles, the combination with the motor and a driving wheel of the vehicle, of a two-part bracket secured to said driving wheel, each part of the bracket having on its inner face a semi-circumferential groove, a resilient member, and means for clamping together the parts of said bracket with said member seated in said groove.

4. In a resilient driving connection for motor driven vehicles, the combination with the motor and a driving wheel of the vehicle, of a two-part bracket secured to said propelling motor, each part of the bracket having on its inner face a semi-circumferential groove, a resilient member, and means for clamping together the parts of said bracket with said member seated in said groove.

5. In a resilient driving connection for motor driven vehicles, the combination with the motor and a driving wheel of the vehicle, of a pair of two-part brackets, one of the brackets being secured to said propelling motor and the other to said driving wheel, and each bracket having on its inner face a groove, a spring having one end seated in the groove of one of said brackets and the other end seated in the groove of the other of said brackets, and transversely extending means for clamping together the parts of said brackets.

6. In a resilient driving connection for motor driven vehicles, the combination with the motor and a driving wheel of the vehicle, of means consisting of a series of resilient coils of different thicknesses of material for resisting the rotary movement of said motor relative to said driving wheel with a force increasing in greater progression than the extent of such movement.

7. In a resilient driving connection for motor driven vehicles, the combination with the motor and a driving wheel of the vehicle, of a bracket, and a spring mounted on said bracket and acting against said driving wheel, said spring consisting of a series of coils of different thicknesses of material.

8. In a resilient driving connection for motor driven vehicles, the combination with the motor and a driving wheel of the vehicle, of a bracket secured to said motor, another bracket secured to said driving wheel, and a spring mounted on both of said brackets for yieldingly transmitting the rotary motion of said propelling motor to said driving wheel, said spring consisting of a series of coils of different thicknesses of material.

9. The combination with a vehicle wheel and a driving member, of a coiled spring interposed between members connected to the wheel and driving member respectively, said spring being coiled from a suitably tapered bar, substantially as and for the purpose described.

In testimony whereof I have hereunto set my hand in the presence of two witnesses.

JOSEPH V. ROBINSON.

In the presence of—
  M. H. BRAKHAGEN,
  ARTHUR L. BRYANT.